US012235127B2

(12) United States Patent
Hicks et al.

(10) Patent No.: US 12,235,127 B2
(45) Date of Patent: Feb. 25, 2025

(54) USE OF GEOSPATIAL COORDINATE SYSTEMS FOR MODIFYING MAP AND ROUTE INFORMATION

(71) Applicant: United States Postal Service, Washington, DC (US)

(72) Inventors: Fharon M. Hicks, Memphis, TN (US); Kosar N. Saeed, Memphis, TN (US); Eric B. Michel, Collierville, TN (US); Seth Lee Johnson, Memphis, TN (US)

(73) Assignee: United States Postal Service, Washington, DC (US)

( * ) Notice: Subject to any disclaimer, the term of this patent is extended or adjusted under 35 U.S.C. 154(b) by 70 days.

(21) Appl. No.: 17/093,301

(22) Filed: Nov. 9, 2020

(65) Prior Publication Data

US 2021/0140791 A1 May 13, 2021

Related U.S. Application Data

(60) Provisional application No. 62/950,725, filed on Dec. 19, 2019, provisional application No. 62/933,724, filed on Nov. 11, 2019.

(51) Int. Cl.
*G01C 21/00* (2006.01)
(52) U.S. Cl.
CPC ..... *G01C 21/3819* (2020.08); *G01C 21/3841* (2020.08)
(58) Field of Classification Search
None
See application file for complete search history.

(56) References Cited

U.S. PATENT DOCUMENTS

| 10,497,256 | B1* | 12/2019 | Mubarek | G01C 21/3841 |
| 10,595,176 | B1* | 3/2020 | Gallagher | G05D 1/02 |
| 10,696,301 | B2* | 6/2020 | Abe | G08G 1/167 |
| 11,231,282 | B2* | 1/2022 | Jang | G01C 21/3841 |
| 2012/0095682 | A1* | 4/2012 | Wilson | G01C 21/32 |
| | | | | 701/532 |

(Continued)

OTHER PUBLICATIONS

Van Doornum, A., International Application No. PCT/US2020/059684 International Search Report and Written Opinion, mailed Feb. 26, 2021. (pp. 1-9) (Year: 2021).*

(Continued)

*Primary Examiner* — Behrang Badii
*Assistant Examiner* — Paysun Wu
(74) *Attorney, Agent, or Firm* — Knobbe, Martens, Olson & Bear, LLP

(57) ABSTRACT

Systems and methods for updating map data are disclosed. A system can include a mobile delivery device that is configured to be transported to a plurality of delivery locations by a parcel carrier. The system may further include a computer readable storage medium and one or more processors. The system may store map data associated with a geographic data. Using the mobile delivery device, the system can receive a plurality of positions during delivery of parcels to a plurality of delivery locations associated with the geographic region. Based on the plurality of positions, the system may determine a delivery route of a parcel carrier, and, based on the delivery route, the system can generate updated map data.

22 Claims, 13 Drawing Sheets

(56) References Cited

U.S. PATENT DOCUMENTS

| | | | |
|---|---|---|---|
| 2012/0116678 A1* | 5/2012 | Witmer | G09B 29/00 |
| | | | 702/5 |
| 2014/0132608 A1* | 5/2014 | Mund | G06T 11/206 |
| | | | 345/440 |
| 2016/0307445 A1 | 10/2016 | Onozawa et al. | |
| 2018/0252536 A1* | 9/2018 | Dorum | G01C 21/3682 |
| 2019/0325382 A1 | 10/2019 | Koohi et al. | |
| 2020/0158515 A1* | 5/2020 | Berry | H04W 4/02 |
| 2020/0202708 A1* | 6/2020 | Fowe | G08G 1/0112 |
| 2021/0231458 A1* | 7/2021 | Millington | G08G 1/0112 |

OTHER PUBLICATIONS

International Preliminary Report on Patentability dated May 17, 2022, in International Application No. PCT/US2020/059684.

* cited by examiner

USE OF GEOSPATIAL COORDINATE SYSTEMS FOR MODIFYING MAP AND ROUTE INFORMATION

CROSS-REFERENCE TO RELATED APPLICATIONS

This application claims the benefit of priority to U.S. Provisional Application Nos. 62/950,725, filed Dec. 12, 2019 and 62/933,724, filed Nov. 11, 2019. Any and all applications for which a foreign or domestic priority claim is identified in the Application Data Sheet as filed with the present application are hereby incorporated by reference under 37 CFR 1.57.

BACKGROUND

Geospatial tracking can be used in systems and methods for generating map information. When streets are modified, new streets created, such as with sub-developments, etc., insufficient map information and geospatial information exists for the modified or new streets. A system for accurately determining the precise geo-coordinates for new and modified streets is desired.

SUMMARY

One aspect described herein is a system for updating map data, the system comprising: a mobile computing device comprising a location circuit to generate breadcrumb data as the mobile computing device moves along a delivery route; and a computer system configured to: receive, from the mobile computing device, the breadcrumb data; generate breadcrumb lines by converting the breadcrumb data into lines connecting the breadcrumbs within the breadcrumb data; generate buffers around the generated breadcrumb lines; generate buffer centerlines from the buffers; determine, based on the buffer center lines, the estimated locations of new streets; and update a map based on the new streets.

In some embodiments, the computer system is further configured to split the breadcrumb lines at one or more points, the points representing street intersections. In some embodiments, the computer system is further configured to split the buffer centerlines at one or more points, the points representing street intersections. In some embodiments, the computer system is configured to merge buffer centerlines with the same endpoints into a single line.

In some embodiments, the computer system is configured to remove buffer centerlines associated with breadcrumb lines generated from a breadcrumb representing the last delivery of a day and a breadcrumb representing the mobile device being activated at a delivery facility the next day. In some embodiments, the computer system is further configured to merge buffer centerlines under a threshold length with surrounding buffer centerlines; In some embodiments, the computer system is further configured to merge buffer centerlines within a threshold distance of other buffer lines to the other buffer centerlines.

In some embodiments, the computer system is further configured to assign attribute values to the buffer centerlines and to select buffer centerlines representing the locations of new streets based on those attribute values. In some embodiments, the attribute values include a street name and the date the street first appeared. In some embodiments, the computer system determines the date the street first appeared based on the breadcrumb data associated with the buffer centerline.

Another aspect described herein is a method for updating map data, the method comprising: receiving, from a mobile computing device, breadcrumb data; generating, by a computer system, breadcrumb lines by converting the breadcrumb data into lines connecting the breadcrumbs within the breadcrumb data; generating, by a computer system, buffers around the generated breadcrumb lines; generating, by a computer system, buffer centerlines from the buffers; and determining, with a computer system, the estimated locations of new streets based on the buffer centerlines; and updating, with a computer system, a map based on the new streets.

In some embodiments, the method further comprises splitting the breadcrumb lines at one or more points, the points representing street intersections. In some embodiments, the method further comprises splitting the buffer centerlines at one or more points, the points representing street intersections. In some embodiments, the method further comprises merging buffer centerlines with the same endpoints into a single line.

In some embodiments, the method further comprises removing buffer centerlines associated with breadcrumb lines generated from a breadcrumb representing the last delivery of a day and a breadcrumb representing the mobile device being activated at a delivery facility the next day. In some embodiments, the method further comprises merging buffer centerlines under a threshold length with surrounding buffer centerlines, In some embodiments, the method further comprises merging buffer centerlines within a threshold distance of other buffer lines to the other buffer centerlines.

In some embodiments, the method further comprises assigning, by a computer system, attribute values to the buffer centerlines and selecting, with a computer system, buffer centerlines representing the locations of new streets based on those attribute values. In some embodiments, the attribute values include a street name and the date the street first appeared. In some embodiments, the computer system determines the date the street first appeared based on the breadcrumb data associated with the buffer centerline.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

Figure 1A:
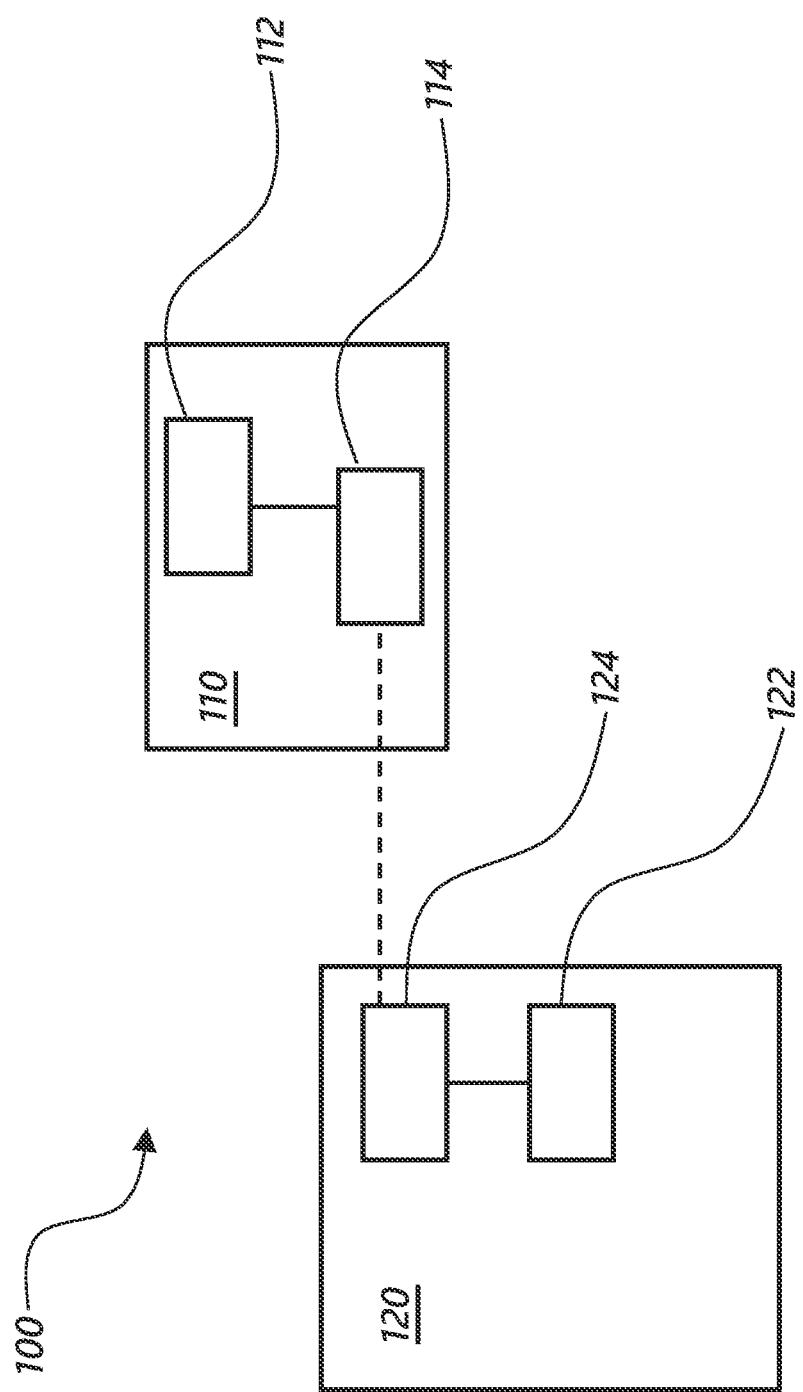
FIG. 1A is a block diagram of an embodiment of a mapping system that includes a mobile delivery device and a computer system.

It is beneficial to a distribution network to know the precise geo-coordinates of a location they are delivering to. A distribution network such as the United States Postal Service (USPS) visits every address in the country at least 6 days a week. Because of this, the USPS is often the first entity to routinely visit a new subdivision, travel new streets, travel modified streets, etc. The delivery resources of the distribution network, such as carriers for the USPS, have mobile delivery devices which contain geolocation capabilities. The information gathered by the distribution system can be used to identify correct and precise locations of delivery points, and to modify or update map data. Often new areas on maps have may be incorrect or imprecise, or have incorrect, imprecise and/or unverified geographic coordinates for locations. For example, a current maps or location database, such as that provided by a developer, builder, etc., may identify a single geolocation for each delivery point in a new subdivision, new housing complex, or new commercial area, rather than having each location identified by separate geographic coordinates. Sometimes delivery points are identified as the center of a road, or a number of delivery points are given at the same point or at an intersection, or other incorrect location, while the correct delivery point is instead the location of the mailbox or driveway of the house. Therefore, a system for updating the map data based on the delivery points is greatly desired.

Map data, including or delivery point coordinate data, can be used or prepared by tracking the actual locations as delivery of items occurs as delivery resources traverse their routes including new or modified streets. In some embodiments, this can be accomplished by using mobile devices to record the GPS coordinates of the location for each delivery at a delivery point that the delivery entity delivers to. The mobile devices may be carried by a postal carrier and/or may be installed in delivery vehicles. Once the numerous positions (e.g., GPS coordinates) for multiple deliveries at one or more delivery points are recorded, this data for various deliveries can then be converted into breadcrumbs of recorded deliveries. For example, as a mail carrier delivers a package with a mobile delivery device (e.g., a scanner, phone, etc.), the mobile delivery device can periodically track the location of the mail carrier. This information can be modified, filtered, segmented, cleaned, smoothed, and/or otherwise improved. The improved information can then be used to update map data. The system may additionally or alternatively pull data from an accelerometer in the mobile delivery device. Thus, based on position and/or acceleration data, the system can update mapping and/or route information.

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The systems and methods described herein relate to updating a map or database of delivery points. FIG. 1A is a block diagram of an embodiment of a mapping system 100 that includes a mobile delivery device 110 and a computer system 120. The mobile delivery device 110 may be a mobile computing device such as a smartphone, tablet computer, other similar computing device that is configured to be moved to different geolocations. In some embodiments, the mobile computing device can be connected to, installed in, integral with, or otherwise associated with a delivery vehicle. The mobile delivery device 110 can be a portable object that is sized to be carried by a delivery resource (e.g., a postal carrier, a motorized vehicle, etc.). The mobile delivery device 110 may be carried by a human carrier or an automated carrier (e.g., a drone, a robot, an autonomous vehicle, etc.).

The mobile delivery device 110 is in communication with the computer system 120. The mobile delivery device 110 can include a controller 112 and one or more sensors 114. The controller 112 can include a processor that controls one or more functions of the mobile delivery device. The controller 112 (e.g., the one or more processors) and the computer system 120 can include processors that execute instructions that may be implemented with any combination of microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The one or more processors may include, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The controller 112 may be in communication with a processor memory, which may include, for example, RAM memory, flash memory, ROM memory, EPROM memory, EEPROM memory, registers, hard disk, a removable disk, a CD-ROM, or any other form of storage medium known in the art. The processor memory may include, for example, software, at least one software module, instructions, steps of an algorithm, or any other information. In some embodiments, the controller 112 performs processes in accordance with instructions stored in the processor memory. These processes may include, for example, controlling features and/or components of the mapping system 100 (e.g., of the mobile delivery device 110), and controlling access to and from, and transmitting information and data to and from the mobile delivery device 110 and the computer system 120, as will be described herein.

The mobile delivery device 110 includes one or more sensors 114 that can be configured to transmit and receive data to and from the computer system 120 (e.g., the computer readable storage medium 124). The sensors 114 can include a data interface (e.g., network interface) that is configured to communicate with the computer readable storage medium 124 and/or with a corresponding data interface of the computer system 120. The sensors 114 can include a radio frequency receiver and/or transmitter. In some embodiments, the one or more sensors 114 includes a microwave and/or infrared light transmitter/receiver. In some embodiments, the sensors 114 include a laser or a scanner, such as a barcode scanner or an optical scanner. In some embodiments, the sensors 114 include an accelerometer, a camera, and any other desired hardware or device. In some embodiments, the sensors 114 are configured for wired and/or wireless communication. In some embodiments, the sensors 114 communicate via telephone, cable, fiber-optic, or any other wired communication network. In some embodiments, the sensors 114 may communicate via cellular networks, WLAN networks, or any other wireless network. The sensors 114 are configured to receive instructions and to transmit and receive information among components of the mapping system 100, and in some embodiments, with the computer system 120 or other resource, which may be outside the mapping system 100, as desired.

The sensors 114 include a geolocation system, such as GPS, capable of identifying the location of the mobile delivery device 110, storing the location data, and transmitting the location data to the computer system 120. In some embodiments, the location data can be recorded and transmitted at 1 second intervals, or at any other desired interval. In some embodiments, the data can be recorded at a higher frequency than the transmission. For example, the data can be recorded at 10 Hz and transmitted every second, or can be recorded every second, and transmitted once every 10 seconds, every minute, etc.

The computer system 120 comprises a computer readable storage medium 124 that is configured to store information, item-carrier information, expected deliveries data and the like. The computer readable storage medium 124 may comprise a database, a comma delimited file, a text file, or the like. The computer system 120 is configured to coordinate and direct the activities of the components of mapping system 100.

In some embodiments, the computer readable storage medium 124 is in communication with the sensors 114. In some embodiments, the computer readable storage medium 124 may comprise a processor, memory, databases, address and control lines, and other components similar to those described herein for the controller 112. In other embodiments, the computer system 120 may be configured to use the processor, memory, databases, address and control lines, and other components of the computer system 120, or a combination of its own components and the components of the mobile delivery device 110.

It is to be understood that there is not a particular number of mobile devices that are required and that the computer system 120 can communicate with any number of mobile delivery devices. In some embodiments, the computer system 120 is configured to receive information from a plurality of mobile delivery devices 110 about the locations, deliveries, scans, and any other data the users of the mobile delivery devices made or generated that day. In some embodiments, this information can be transmitted as the deliveries occur or can be transmitted in bulk in the form of a log file periodically, such as once per day. In some embodiments, when the user of a mobile delivery device, such as a carrier or delivery resource, delivers an item, the user can scan the item or the mailbox where the item was delivered. Scanning the item or mailbox can include an optical scan, a barcode scan, a scan of a computer readable code on the item, communicating with an RFID tag, a near field communication or Bluetooth interaction, and the like.

The delivery resource may then be required to state or otherwise communicate whether the item was delivered to a mailbox, door or other location at the address the user was delivering to. In some embodiments, the delivery resource must also state what kind of item was delivered, such as a letter, package, or other type of item. Additionally or alternatively, the type of item that was delivered is automatically indicated by the scan. When the user scans an item or mailbox with one of the mobile delivery devices, the mobile device records an associated GPS coordinate, in addition to the GPS breadcrumb data being generated as the delivery resource traverses a geographic area or the delivery resource's assigned route. The mobile device can also associate all of the information collected from its user and the GPS coordinates with a unique key for the address that the item was delivered to.

In some embodiments, the mobile delivery device 110 can also transmit stop information to the computer system 120. In some embodiments, a stop can be identified at a time and location that a delivery resource using a mobile delivery device 110 stops. In some embodiments, a stop can be identified when the mobile delivery device 110 is stationary for 3 seconds, 5 seconds, 1 minute, 10 minutes or any other time. In some embodiments, the mobile delivery device 110 can determine when a stop occurs through accelerometer and GPS data.

In some embodiments, when the user of one of the mobile delivery device 110 scans an item, the user can record information about how the item is delivered, called a delivery type. In some embodiments, the user of the mobile delivery device 110, such as a carrier or distribution network employee, can similarly record a code designating where the delivery took place.

In some embodiments, the computer system 120 contains the maps of delivery points, streets, and other geographic and man-made features. In some embodiments, the mobile delivery device 110 can send information to the computer system 120, which can be used by the computer system 120, or by another system with which the computer system 120 is in electronic communication, to update the delivery points based on the GPS information, including breadcrumb information, delivery point scans, etc., determined by the mobile delivery device 110. In some embodiments, this information is stored in the computer readable storage medium 124 until it is transmitted, for example, to the mobile delivery device 110.

Figure 1B:
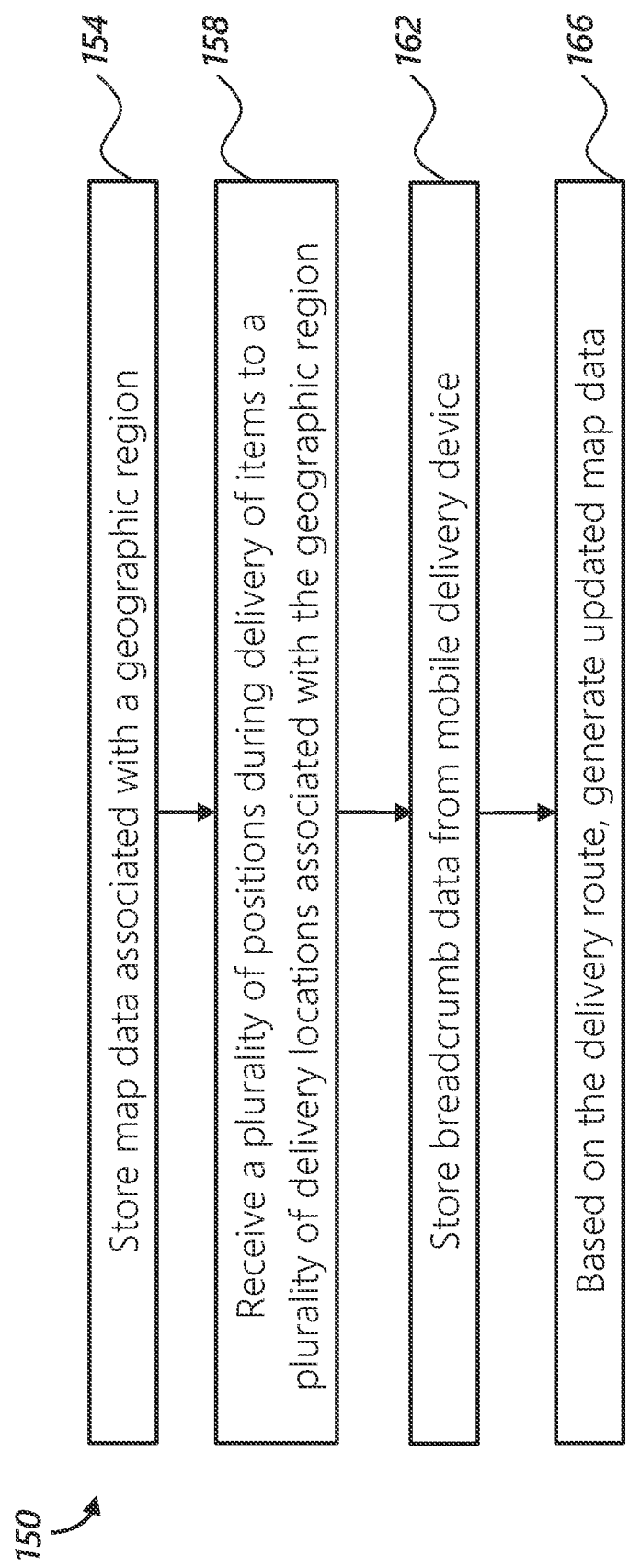
FIG. 1B shows an example method for updating map data.

FIG. 1B shows an example method 150 for updating map data for a new or modified street pattern. The method 150 can include a number of steps that may be performed by a computer (e.g., the computer system 120) and/or may be used in conjunction with one or more mobile delivery devices (e.g., the mobile delivery device 110). For example, at block 154, the method 150 can include obtaining and/or storing map data associated with a geographic region. The map data may be obtained, for example, from a commercial source or other source, or from one or more mobile delivery devices (e.g., the mobile delivery device 110) or from another system within the distribution network. The map data can be obtained from previous GPS breadcrumb data, for example, when a street pattern has been modified, or for a new area, and carriers have traversed the route one or more times, and the map data is going to be updated based on iterative GPS information. For example, a geographic area with new streets may be traversed a plurality of times, and GPS information gathered and analyzed each time in order to ensure a subsequently generated map is accurate. The mobile delivery device can identify the location via a GPS and store it locally and/or transmit it to a central and/or remote computer (e.g., the computer system 120).

At block 158, the method 150 can include receiving a plurality of geographic locations and corresponding times during delivery of items to a plurality of delivery locations associated with the geographic region. The plurality of geographic locations can be breadcrumb data. The plurality of positions may be obtained with the mobile delivery device 110. The breadcrumb data can correlate to a delivery route traversed by a carrier. The positions may be obtained over the course of a day, a week, a month, a year, multiple years, or any time therebetween.

At block 162, the method 150 includes storing breadcrumb data obtained from the mobile delivery device 110. The delivery route may be determined based on the plurality of positions obtained in block 158. At block 166, the method 150 may, based on the delivery route, include generating updated map data. The updated map data may be stored on a central computing device (e.g., the computer system 120). In some implementations, the method 150 includes transmitting, via a network interface (e.g., within the one or more sensors 114), the updated map data to a remote computing device, such as the computer system 120. The method 150 can additionally or alternatively include modifying the determined delivery route based on a feature of the geographic region. The feature of the geographic region may include a terrain of the geographic region, a location of interest, an additional location, a road, and/or any other feature that may be encountered by a mail carrier.

For example, a mail carrier may generally traverse a most efficient or shortest route based on existing map data. Once the map data have been updated, the most efficient and/or shortest route may be updated. Thus, the method 150 may include updating the map data based on new information obtained, for example, from the mobile delivery device.

In some implementations, the method 150 includes receiving the plurality of geographic locations associated with the geographic region based on whether the plurality of positions are spaced at least a threshold distance from a reference location. In this way, the method 150 can avoid unnecessary duplicates of position data. The threshold distance may be about 0.5 m, about 1 m, about 2 m, about 3 m, about 4 m, about 5 m, about 8 m, about 10 m, about 12 m, about 18 m, about 20 m, about 23 m, about 25 m, about 30 m, about 35 m, about 40 m, about 50 m, any value therebetween, or be within a range having any endpoints therein. For example, the threshold distance is between about 1 m and about 25 m in some embodiments. The reference location may be a delivery location of the plurality of delivery locations. The delivery locations may include houses, apartments, farms, plots of land, commercial buildings, and/or any other delivery location configured to receive deliverable items.

The method 150 can include obtaining the geographic location data at a particular rate (e.g., how often a position is obtained). For example, the rate can be a position about every 0.1 s, about every 0.5 s, about every 1 s, about every 5 s, about every 10 s, about every 15 s, about every 20 s, about every 30 s, any value therebetween, or be within a range having any endpoints therein. For example, in some embodiments, the rate is one geographic location, or GPS reading recorded every 0.1 seconds, and the mobile delivery device 110 transmits the geographic location to the computer system 120 every second. The obtained positions may be compiled, agglomerated, aggregated, combined, etc., in the computer system 120 at a frequency of about every 1 s, about every 5 s, about every 10 s, about every 30 s, about every 1 min, about every 2 min, about every 5 min, about every 10 min, any value therebetween, or be within a range having any endpoints therein. In some embodiments, the upload frequency is about every minute.

The method 150 can further include obtaining topology data associated with the plurality of positions using the mobile delivery device. For example, the method 150 may identify hills, valleys, mountain curves, or other topological feature using the accelerometer data recorded by the mobile delivery device 120 to identify when the delivery resource is moving uphill, downhill, the slope of the hill, other elevation changes, etc. The updated map data may include and/or be based on the topological data obtained. The method 150 may include modifying the delivery route based on a feature of the plurality of positions received. The feature of the plurality of positions received (e.g., by the computer system 120) can include a minimum number of positions received. The method 150 may include removing portions of the delivery route if a number of positions received is lower than the minimum number of positions received. Thus, the method 150 can include reducing wasted resources seeking to update map information where an insufficient amount of location and/or other map data has been obtained. The method 150 may further include generating updated map data based on a curvature of a portion of the delivery route. For example, delivery routes with a high number of left turns, U-turns, etc., may not be preferred. Thus, the updated map data may provide route information and other map information that could be beneficial for government entities, retailers, commercial entities, or any other entity.

Figure 2A:
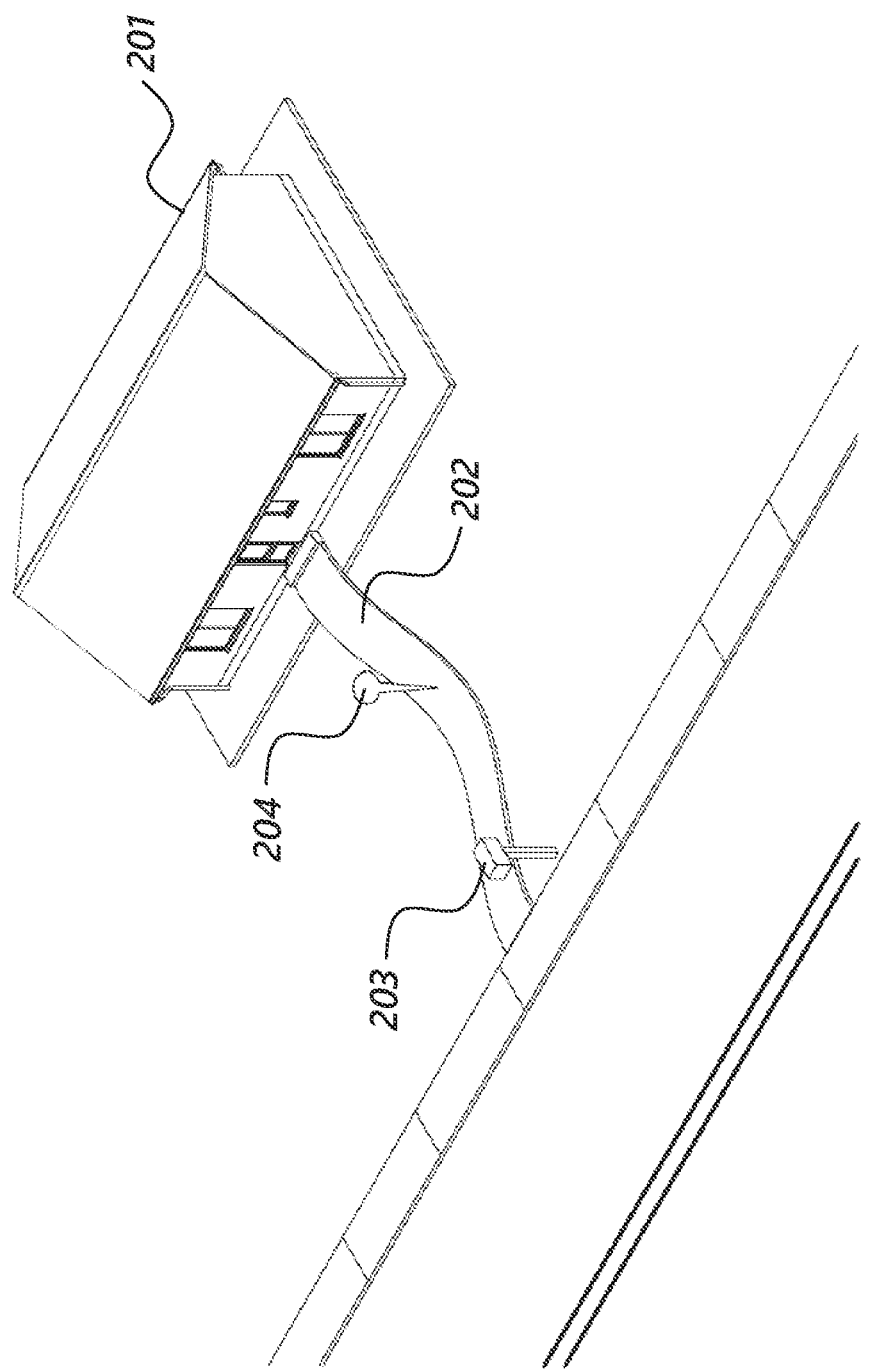
FIG. 2A displays a house, a carrier path, a mailbox, and an example delivery point.
Figure 2B:
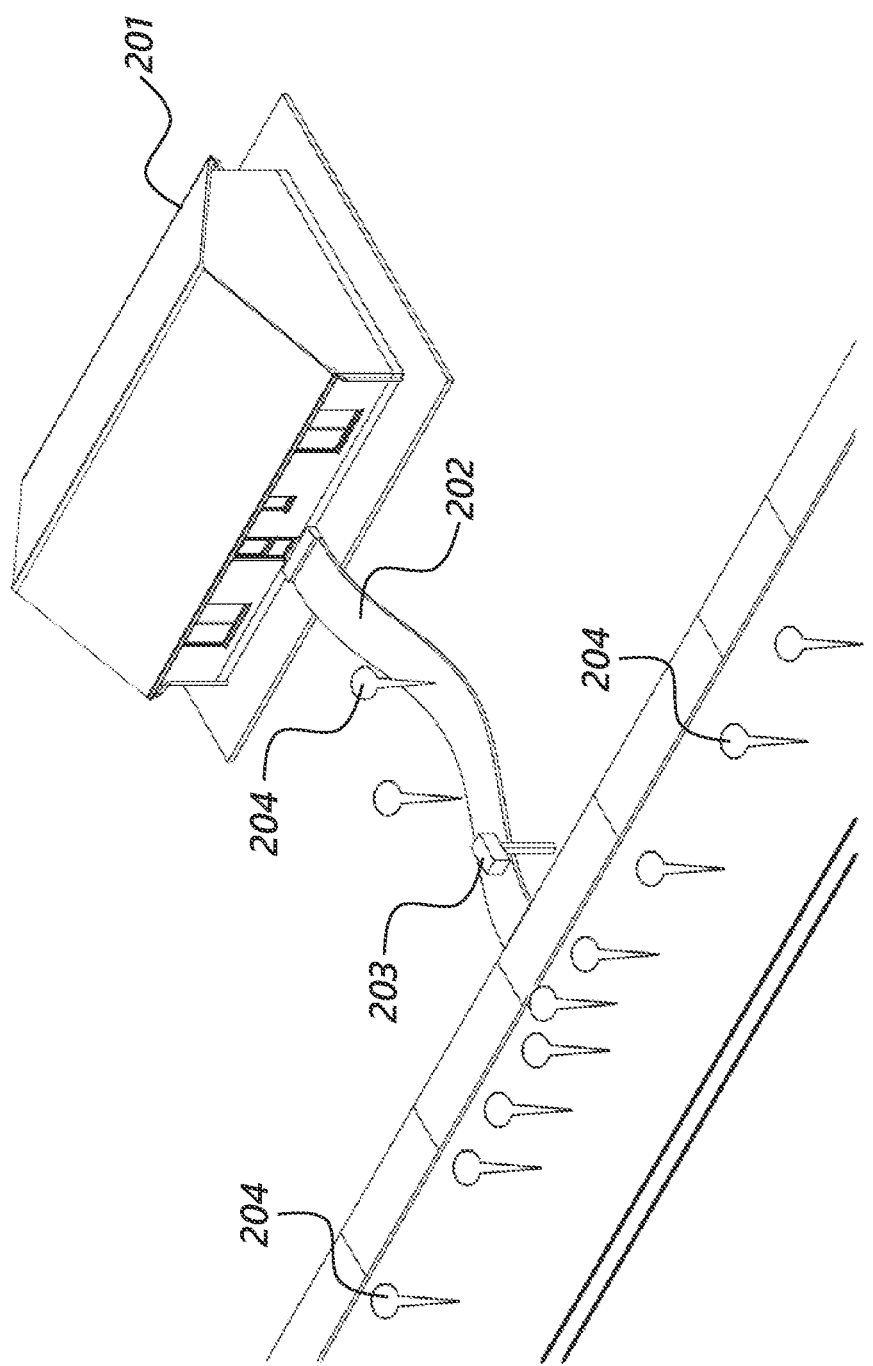
FIG. 2B shows multiple delivery points that may be obtained based on a route taken by the postal carrier.

FIG. 2A-2B are diagrams illustrating example points (e.g., delivery points, breadcrumb data, etc.) that may be obtained by the mapping system 100 for generating updated map and/or route information based on the obtained points. FIG. 2A displays a house 201, a path 202, a mailbox 203, and an example delivery point 204. As shown, only one carrier positions 204 has been obtained for clarity of illustration. As seen in FIG. 2B, the multiple delivery points 204 may be obtained based on a route taken by the postal carrier (e.g. with the mobile delivery device 110). Obtained points may be spaced further apart where the mail carrier has traveled faster (e.g., in the street in a car) and may be clustered more closely where the carrier traveled more slowly (e.g., near the house 201 on foot). Additional information on clustering and how clustering can apply to updating map information may be found in U.S. patent application Ser. No. 16/386,661, titled "USE OF GEOSPATIAL COORDINATE SYSTEMS FOR TRACKING ITEM DELIVERY," filed on Apr. 17, 2019, which is hereby incorporated by reference herein in its entirety.

Figure 3A:
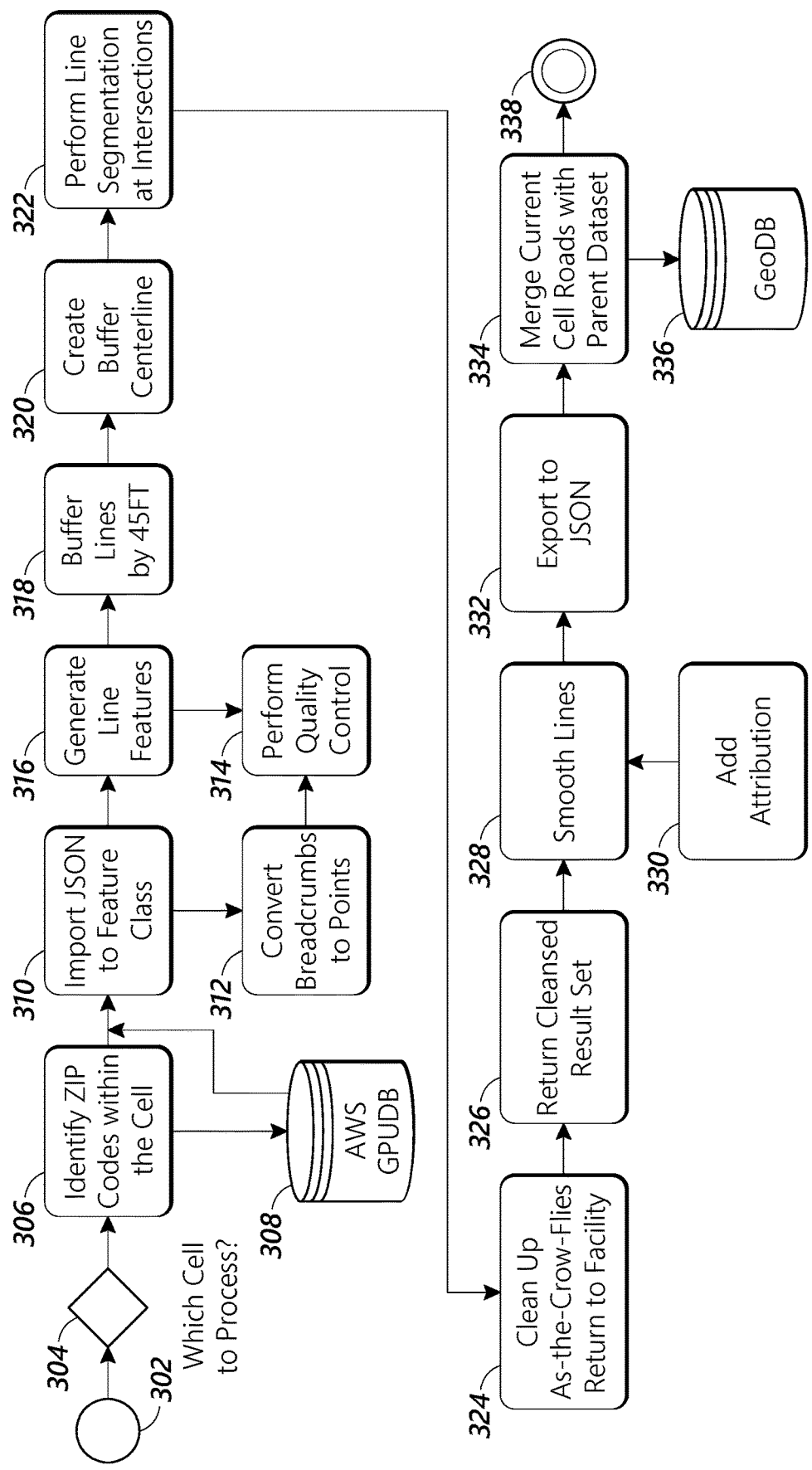
FIG. 3A shows a flow chart depicting an example embodiment of a method for updating map and/or route information using a mapping system.

FIG. 3A shows a flow chart depicting an example embodiment of a method 300A for generating a map and/or updating map information using the mapping system 100 described above. The method 300A can begin at block 302. At block 304, the method 300A determines which cell (e.g., region of a geographic area) to process. For example, in some embodiments, the method 300A may process each cell of a geographic region sequentially and/or the processing may be based on which cell has received the most updated map data (e.g., breadcrumbs), or which cell includes new or modified streets. The country or any geographic area can be divided into cells. For example, the USPS may divide the U.S. into 6,482 cells, with each cell having a certain number of ZIP codes associated therewith. The processes described herein can be performed for all carriers and all routes with a certain periodicity. By doing all the routes for all the carriers, new or emerging roads can be identified, and maps can be updated for new or emerging roads, and the accuracy of existing maps can be improved.

The process 300A moves to block 306, wherein the computer system 120 identifies one or more zip codes within the cell. Although described in terms of a ZIP code, any geographic area could be selected within the cell for processing. The computer system may analyze cells on a rotating basis, such that all cells are not analyzed at the same time, in order to improve computer efficiency and to reduce time and costs for analysis. When the cell has been identified, these data may be sent and/or confirmed by a database (e.g., remote database, local database) at block 308. Further, in block 308, the computer system 120 can pull a set number of days' worth of bread crumb data for analysis. For example, the computer system 120 can request or call for three days of breadcrumb data, or 15 days, or any other number of days, for analysis for each ZIP code. In some embodiments, the system can obtain one week's worth of breadcrumb data, that is, in the case of the USPS, 6 consecutive days of breadcrumb data.

The system may upload JSON data to feature data (e.g., as a feature class) at block 310. At block 312, the computer system 120 can convert the position data (e.g., the breadcrumbs) to points, by, for example, overlaying them on a geographic representation, such as digital map, and can merge all the breadcrumb data from all the days, from all the carriers within one ZIP code, within one or more areas, or within one cell, into a single utility for manipulation and analysis.

The method 300A moves to block 314, wherein the computer system 120 performs quality control of these points. In urban canyons, or in places where structures or other features can obscure a clear view of the sky, the GPS coordinates from the mobile delivery devices can be less accurate. The quality control of points can be focused on urban canyons or other similar areas. Performing quality control can include removing duplicates, removing extraneous data, clearly erroneous points, removing static, jitter, and the like, confirming the location of the points, or some other type of quality control. The locations may be confirmed, for example, by comparing GPS data with accelerometer data, comparing location data with previously known carrier routes, and/or verifying the route data with another source. In some embodiments, extraneous points can be identified as points which deviate from a cluster of points, or which are more than a threshold distance from preceding and subsequent points. Other methods for identifying extraneous points can also be used.

The method 300A moves to block 316 wherein the computer system 120 generating line features. The computer system 120 converts all the breadcrumbs into lines connecting all the breadcrumbs, e.g. breadcrumb lines. This results in a network, grid, and/or series or grouping of lines overlaid on the geographical area. The line features may include contours of a region, connections among points and/or point clusters, and/or topological features. The breadcrumb line can be a line passing through the average locations of breadcrumbs for the same locations obtained for a number of days, such as the 6 days of breadcrumbs generated in a week, being analyzed.

The process 300A moves to block 318, wherein the connected breadcrumb lines are buffered based on a minimum threshold distance. The buffer can take into account deviations from a straight line between a preceding and a subsequent point, or between other points. The buffer can be drawn wide enough such that all, most, or a certain threshold of points in the line are within the buffer boundary. In some embodiments, the buffer can be for example, 45 feet. In some embodiments, point data that is within a threshold distance or less from a known delivery route may be discarded as being duplicative. In some embodiments, this may be advantageous since in some implementations point data may only be desired that is far enough away from buildings to get updated map data that does not include private property, for example. Thus, in this way, the map and/or route updates can include street data as opposed to sidewalk data. In some embodiments, buffers may include about 5 feet, about 10 feet, about 15 feet, about 20 feet, about 25 feet, about 30 feet, about 35 feet, about 40 feet, about 50 feet, about 60 feet, any value therebetween, or be within a range having any endpoints therein, or any other desired distance.

The method 300A moves to block 320, wherein a buffer centerline is created. The buffer centerline runs between the buffer boundaries and follows the same path or pattern as the line generated from the breadcrumb data. The buffer centerline can be determined to correspond to a centerline of a road or a street. In some embodiments, for example, points on the side of the buffer centerline closer to a delivery location (e.g., near private property) may be discarded or omitted.

The method 300A moves to block 322, wherein the buffer centerline lines are be segmented at intersections. In some embodiments, the computer system 120 identifies an intersection in the point data, such as where there is a longer space between delivery points, where there are stops, where two buffer centerlines intersect, etc. In some embodiments, the computer system 120 can determine where one line intersects with another line, determine that the line intersection indicates a street intersection, and divide the line into 4 segments. For example, if the computer system 120 identifies one line running east-west intersecting another line running north-south, the computer system could separate the two lines into four segments, north, south, east, and west, divided at the point the lines intersect. The computer system 120 identifies an intersection, and segments the lines accordingly. Thus, line segments can extend between identified intersections. The line segments can be advantageously generated in order to ensure that the line segments at later points in the process can be properly attributed. Otherwise, a line may later be attributed with a first set of attributes, when the line indicative of an emerging road may, in reality, comprise to connected roads, or which may have different attributes, for example, if the line crosses a city line, a county line, a geographic boundary, changes name, etc.

The method 300A moves to block 324, wherein the computer system cleans up (e.g., removes) points that correspond to travel by a carrier back to the return facility. This travel may include generating lines drawn that connect a delivery point and the return facility as the crow flies. For example, in some embodiments, lines may include lines drawn from the last delivery of a day directly to a facility where mobile device 110 is picked up for use the next day, with no other breadcrumb points in between. These lines can be removed from the data set by detecting the fact that they are formed only from two points, and that no breadcrumb data exists that corresponds to the as-the-crow-flies line. Omission of such points can reduce unnecessary computing power and avoid certain map update errors. The resulting cleansed set can be returned at block 326.

The method 300A moves to block 328, wherein the computer system 120 smooths the centerlines in the data. The lack of smoothness can be due to minor errors or inaccuracies due to the nature of GPS data points, or due to minor differences in position of a carrier on different days, etc. Line smoothing may involve estimating intermediate points between obtained points during the carrier route. As indicated by block 330, the method 300A can include smoothing the lines based on an attribution of the carrier.

In block 330, the computer system 120 can associate attribute data to the lines. Attribute data can include road class, road type, street name, address suffixes, directionality, and other attributes of a street. Breadcrumb data alone may not provide road class, street name, and other information. In some embodiments, the mapping system 100 can used breadcrumb data associated with a parcel delivery to identify a street name for a breadcrumb data point. When the parcel is scanned, the street name for the delivery point is known in the mapping system 100, and when the breadcrumb is generated for the parcel scan, the mapping system 100 can identify the street name, or other information, and add the street name to the breadcrumb data extending in a line or in a desired direction from the parcel scan. The street name and other attributes can be added or appended to the identified street. In some embodiments, the computer system 120 can also receive attribute data from a DPF (delivery point file) which is appended to the street.

At block 332, the data may be exported to a database (e.g., JSON).

Once obtained, the newly obtained map data may be merged with existing map and/or route information at block 334. This information can be transmitted and/or stored in a database at block 336. The database may be a local database (e.g., in the mobile delivery device), at least temporarily, and/or a remote database (e.g., the computer system 120 described herein). The updated map can be stored in a geodatabase, for example, an emerging roads geodatabase. The method 300A can end at block 338.

Figure 3B:
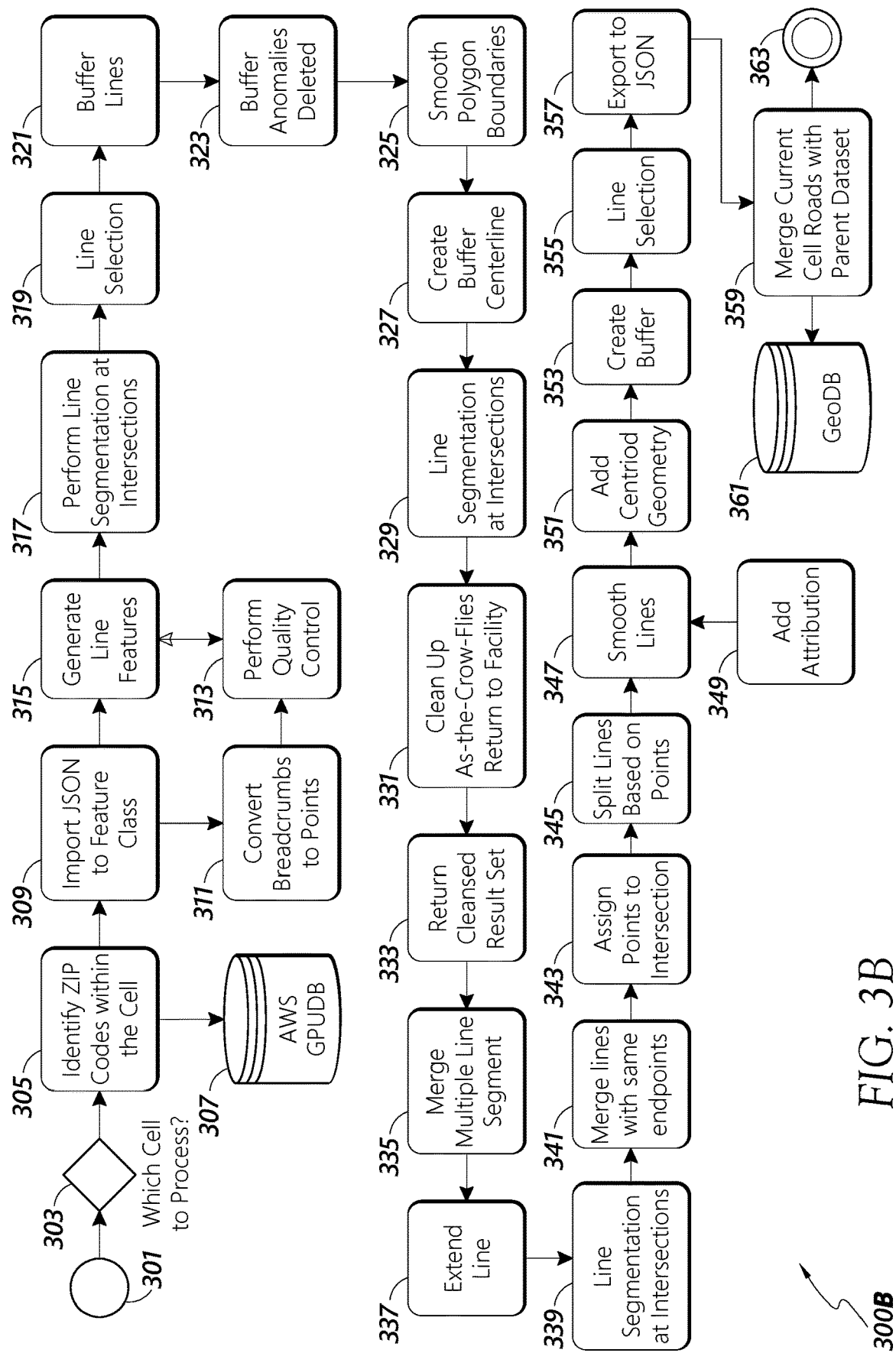
FIG. 3B shows a flow chart depicting an example embodiment of a method for updating map and/or route information using a mapping system.

FIG. 3B shows a flow chart depicting an example embodiment of a method 300B for generating a map and/or updating map information using the mapping system 100 described above. Features of the method 300B can be similar to those described above with regard to method 300A. The method 300B can begin at block 301. At block 303, the method 300B determines which cell (e.g., region of a geographic area) to process. For example, in some embodiments, the method 300B may process each cell of a geographic region sequentially and/or the processing may be based on which cell has received the most updated map data (e.g., breadcrumbs), or which cell includes point address added. The country or any geographic area can be divided into cells. For example, the USPS may divide the U.S. into 6,482 cells, with each cell having a certain number of ZIP codes associated therewith. The processes described herein can be performed for all carriers and all routes with a certain periodicity. By doing all the routes for all the carriers, new or emerging roads can be identified, and maps can be updated for new or emerging roads, and the accuracy of existing maps can be improved. In addition, the process can look at new addresses added and process all the breadcrumbs for the route associated with the new addresses to generate emerging streets.

The process 300B moves to block 305, wherein the computer system 120 identifies one or more zip codes within the cell. The computer system may analyze cells on a rotating basis, such that all cells are not analyzed at the same time, in order to improve computer efficiency and to reduce time and costs for analysis. When the cell has been identified, these data may be sent and/or confirmed by a database (e.g., remote database, local database) at block 307. Further, in block 307, the computer system 120 can pull a set number of days' worth of bread crumb data for analysis. For example, the computer system 120 can request or call for three days of breadcrumb data, or 6 days, or 15 days, or any other number of days, for analysis for each ZIP code.

The system may upload JSON data to feature data (e.g., as a feature class) at block 309. At block 311, the computer system 120 can convert the position data (e.g., the breadcrumbs) to points, and can merge all the breadcrumb data from all the carriers within one ZIP code, or within one cell, into a single utility for manipulation and analysis.

The method 300B moves to block 313, wherein the computer system 120 performs quality control of these points. In urban canyons, or in places where structures or other features can obscure a clear view of the sky, the GPS coordinates from the mobile delivery devices can be less accurate. The quality control of points can be focused on urban canyons or other similar areas. Performing quality control can include removing duplicates, removing extraneous data, clearly erroneous points, removing static, jitter, and the like, confirming the location of the points, or some other type of quality control. The locations may be confirmed, for example, by comparing GPS data with accelerometer data, comparing location data with previously known carrier routes, and/or verifying the route data with another source.

The method 300B moves to block 315 wherein the computer system 120 generates line features. For example, the computer system 120 converts all the breadcrumbs into lines connecting all the breadcrumbs, e.g. breadcrumb lines. This results in a network, grid, and/or grouping of lines overlaid on the geographical area. The line features may include contours of a region, connections among points and/or point clusters, and/or topological features. The breadcrumb line can be a line passing through the average locations of breadcrumbs for the same locations obtained for a number of days, such as the 6 days of breadcrumbs generated in a week, being analyzed.

The process 300B moves to block 317, wherein the connected breadcrumb lines are segmented in intersections. In some embodiments, the computer system 120 identifies an intersection in the point data, such as where there is a longer space between delivery points, where there are stops, where two buffer centerlines intersect, etc. The computer system 120 identifies an intersection, and segments the lines accordingly. In some embodiments, the computer system 120 can determine where one line intersects with another line, determine that the line intersection indicates a street intersection, and dived the line into 4 segments. For example, if the computer system 120 identifies one line running east-west intersecting another line running north-south, the computer system could separate the two lines into four segments, north, south, east, and west, divided at the point the lines intersect. The line segments can be advantageously generated in order to ensure that the line segments at later points in the process can be properly attributed. Otherwise, a line may later be attributed with a first set of attributes, when the line indicative of an emerging road may, in reality, comprise to connected roads, or which may have different attributes, for example, if the line crosses a city line, a county line, a geographic boundary, changes name, etc.

The method 300B moves to block 319, wherein lines that are associated with the breadcrumbs are selected and a new layer is created. This allows any lines that were not related to the breadcrumb not to be selected. The process 300B moves to block 321, wherein the connected breadcrumb lines may be buffered based on a minimum threshold distance. The buffer can take into account deviations from a straight line between a preceding and a subsequent point, or between other points. The buffer can be drawn wide enough such that all, most, or a certain threshold of points in the line are within the buffer boundary. In some embodiments, the buffer can be for example, 30 feet. In some embodiments, point data that is within a threshold distance or less from a known delivery route may be discarded as being duplicative, extraneous, or erroneous. In some embodiments, this may be advantageous since in some implementations point data may only be desired that is far enough away from buildings to get updated map data that does not include private property, for example. Thus, in this way, the map and/or route updates can include street data as opposed to sidewalk data. In some embodiments, buffers may include about 5 feet, about 10 feet, about 15 feet, about 20 feet, about 25 feet, about 30 feet, about 35 feet, about 40 feet, about 50 feet, about 60 feet, any value there between, or be within a range having any endpoints therein, or any other desired distance.

The method 300B moves to block 323, wherein polygon anomalies created from buffer generation are eliminated. For example, if a street has a large median between two lanes, the buffering process may indicate that there is two separate streets because the median is not contained within the buffer from the breadcrumb data. In some embodiments, buffering can create different anomalies. This anomaly and other similar anomalies can be removed. The method 300B moves to block 325, wherein the computer system 120 smooths the polygon, removing any jagged edges.

The method 300B moves to block 327, wherein a buffer centerline is created. The buffer centerline runs between the buffer boundaries and follows the same path or pattern as the line generated from the breadcrumb data. The buffer centerline can be determined to correspond to a centerline of a road or a street. In some embodiments, for example, points on the side of the buffer centerline closer to a delivery location (e.g., near private property) may be discarded or omitted. The method 300B moves to block 329, wherein the buffer centerline lines are again segmented at intersections, similar to what was described in block 317 above. This process is repeated to detect any new line intersections that appear after the buffering process. For example, the computer system 120 can identify an intersection in the point data, such as where there is a longer space between delivery points, where there are stops, where two buffer centerlines intersect, etc., the computer system 120 identifies an intersection, and segments the lines accordingly.

The method 300B moves to block 331, wherein the computer system cleans up (e.g., removing) points that correspond to travel by a carrier back to the return facility. This travel may include generating lines drawn that connect a delivery point and the return facility as the crow flies. For example, in some embodiments, lines may include lines drawn from the last delivery of a day directly to a facility where mobile device 110 is picked up for use the next day, with no other breadcrumb points in between. These lines can be removed from the data set by detecting the fact that they are formed only from two points and by detecting that no breadcrumb data exists that corresponds to the as-the-crow-flies line. Omission of the points forming the lines can reduce unnecessary computing power and avoid certain map update errors. The resulting cleansed set can be returned at block 333.

The method 300B moves to block 335, wherein centerlines that have been split in areas with no intersection are merged into one feature. For example, in some embodiments, a single street between two intersections may be represented by two lines in the data as an artifact of the processing process. These lines can be combined into one line. In some embodiments, the computer system 120 can detect line that should be combined by determining the length of lines. Then if a line is shorter than a threshold distance, the line is combined with the adjacent line or nearest line. In some embodiments, this threshold can be six feet, 10 feet, 20 feet, or any other distance. The method 300B moves to block 337 wherein centerlines that may have not been connected at intersection are extended to allow full connectivity. For example, in some embodiments, the computer system 120 can determine that the ending of one line is within a threshold distance of intersecting with another line. The computer system 120 can then extend the line to intersect. In some embodiments, this threshold can be six feet, 10 feet, 20 feet, or any other distance.

The method 300B moves to block 339, wherein the computer system 120 again identifies an intersection where two centerlines meet and segments the lines to detect any new segments. The method 300B moves to block 341, wherein the computer system 120 initiates process to merge any lines that have corresponding end points, thereby eliminating duplicate lines. The method 300B moves to block 343, wherein the computer system assigns a point to the intersection between two lines. The method 300B moves to block 345, wherein the computer system 120 splits lines using point feature created in previous process to divide the lines into final segments and detect new segments that may be identifiable after the merging process of block 341. The method 300B moves to block 347, wherein the computer system 120 smooths the centerlines in the data. The lack of smoothness can be due to minor errors or inaccuracies due to the nature of GPS data points, or due to minor differences in position of a carrier on different days, etc. Line smoothing may involve estimating intermediate points between obtained points during the carrier route.

As indicated by block 349, the computer system 120 can associate attribute data to the lines. Attribute data can include road class, road type, street name, address suffixes, directionality, and other attributes of a street. Breadcrumb data alone may not provide road class, street name, and other information. In some embodiments, the mapping system 100 can used breadcrumb data associated with a parcel delivery to identify a street name for a breadcrumb data point. When the parcel is inducted into the distribution network, a street address can be stored for the item, and a unique identifier on the parcel is associated therewith. Subsequently, when the item is scanned for delivery, the street name breadcrumb data is generated for the parcel scan. The mapping system 100 can identify the street name, or other information, from a parcel tracking system or other system storing the address and/or unique identifier, and can add the street name to the breadcrumb data extending in a line or in a desired direction from the parcel scan, to the line segment where the scan occurred, etc. The street name and other attributes can be added or appended to the identified street. In some embodiments, the computer system 120 can also receive attribute data from a DPF (delivery point file) which is appended to the street. In some embodiments, the attribute data can also include a date for when a street first appeared. In some embodiments, the system can determine this date based upon the average of the date of the first breadcrumbs recorded on the along the line designating the street or associated with the street or line, or based on the date of an individual breadcrumbs recorded along the street or associated with the street or line, such as the center most breadcrumb. In some embodiments, the system can use this date to determine whether a street is new, e.g. has not yet been mapped. In some embodiments, the method 300B only considers the lines representing new streets through the rest of the method.

The method 300B moves to block 351 wherein the computer system identifies the centroid of the new streets, e.g. the center point of the street based on the line data. The method 300B then moves to block 353, where buffer is created around the centroid of the new street. In some embodiments, the buffer can be a circle surrounding the centroid with a certain radius. In some embodiments, the radius is 200 feet, 400 feet, or any other distance. At block 355 the computer system extracts the streets with that have any point within the buffer. This ensure that only map date relevant to new streets is selected. The method 300B moves to block 357, where the data may be exported to a database (e.g., JSON).

Once obtained, the newly obtained map data may be merged with existing map and/or route information at block 359. This information can be transmitted and/or stored in a database at block 361. The database may be a local database (e.g., in the mobile delivery device), at least temporarily, and/or a remote database (e.g., the computer system 120 described herein). The updated map can be stored in a geodatabase, for example, an emerging roads geodatabase. The method 300B can end at block 363.

In some embodiments, street digitization can occur by collecting breadcrumb data for a plurality of carriers, or for a single carrier. In some embodiments, the breadcrumb data collected can include only breadcrumb points that indicate driving. Each breadcrumb can be categorized based on an activity of the delivery resource, such as walking, driving, etc., as described in U.S. application Ser. No. 16/386,661.

A processor can obtain the breadcrumb data, a delivery point file, such as a listing of the geographic coordinates from an address management database or similar system, and a digital globe onto which the breadcrumb data will be layered.

Figure 4:
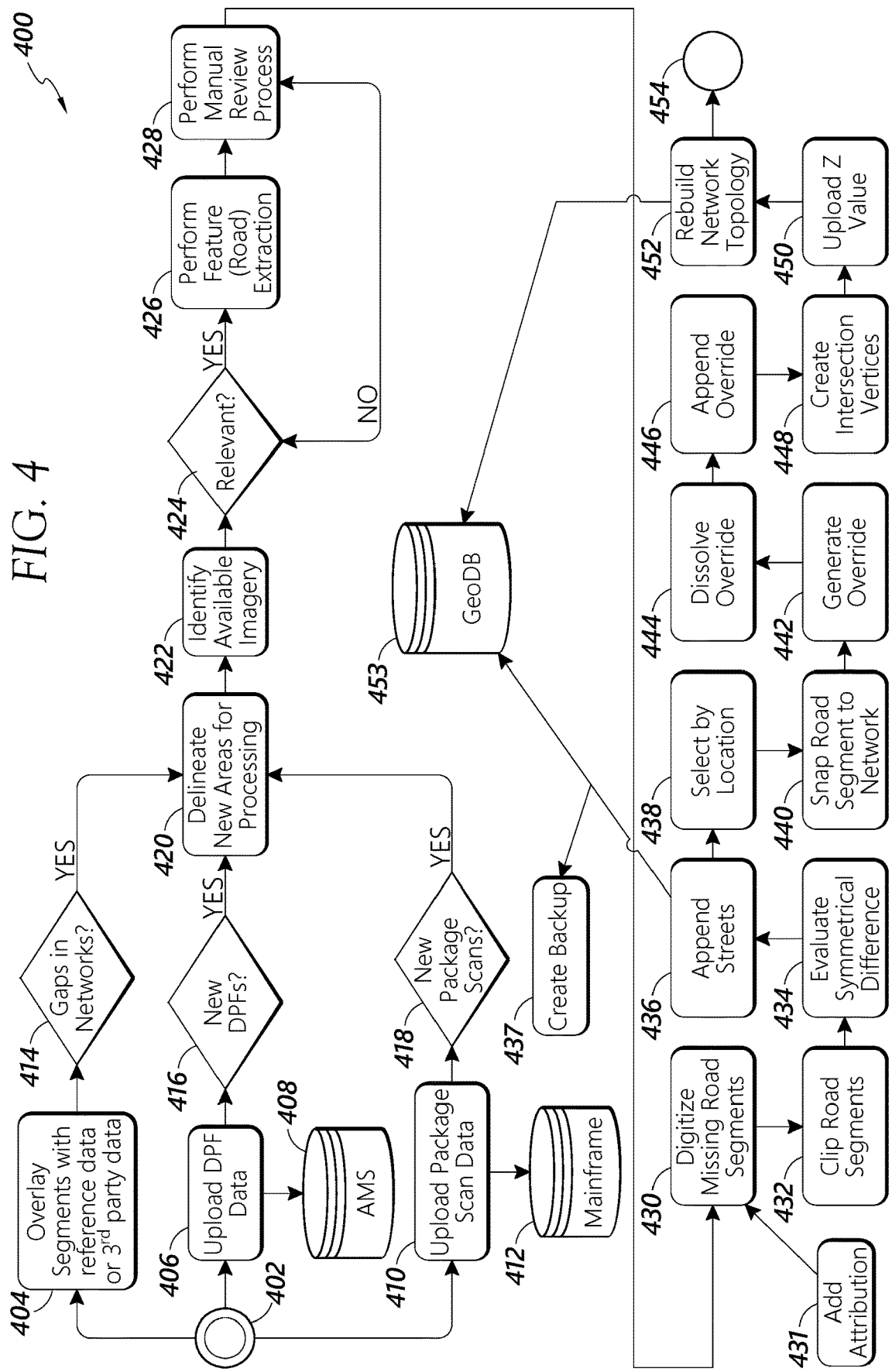
FIG. 4 shows another example method for updating map and/or route information using a mapping system.

FIG. 4 shows another example method 400 for updating map and/or route information using the mapping system 100 described above. The method 400 begins at block 402. From block 402, the method 400 can go in one or more of three routes to determine if new areas or regions need to be mapped or delineated. At block 404, the method 400 can overlay postal segments (e.g., route segments), which have, for example, been generated using the systems and processes described herein, with reference network data or third party data, or data from a source other than the reference network data. The method 400 can identify new or emerging roads based on a comparison of distribution network data, such as USPS data, with other data, such as a third party mapping or street data. The method 400 can include checking for gaps in the overlay process at block 414. If gaps exist, the method 400 can delineate new areas (e.g., geographical regions) for processing. If no gaps exist, the method 400 may terminate. For example, the mapping system 100 can determine where new streets or emerging roads are by overlaying breadcrumb data or mapping data from the distribution network with the map from the third party data. Any place that the streets do not overlap can be considered a new street or an emerging road.

From the block 402, the method 400 may move to block 406 and upload delivery point file (DPF) data. The DPF data may be uploaded to a database, such as the Address Management System (AMS) of the USPS at block 408. The DPF can include a list of delivery points, destinations, or addresses to which the USPS delivers. The AMS can store geographic coordinates for each of the delivery points in the DPF. The method 400 can include checking for new DPFs at block 416. New DPFs can be provided when a new subdivision, commercial area, or other new structure, complex, etc., is constructed, and the distribution network will deliver thereto. If new DPFs are identified, the method 400 can delineate new areas for processing at block 420. The DPF data can be the distribution network data used to compare to the third party data to identify the new areas for processing in block 420.

The method 400 can move to block 410, wherein the computer system 120 or a processor in communication therewith can uploading package scan data, obtained by mobile delivery devices 110 when a package is delivered to a delivery point. The package scan data can be passed to a mainframe and/or database at block 412. In some embodiments, the mainframe can be part of the computer system 120 described herein. Based on the package scan data and the information in the mainframe, the method 400 can determine whether the package scan data is new, for example, if there are scans at geographic locations which do not have an associated AMS entry or DPF entry. If it is new, the method 400 continues to block 420.

From block 420, the method 400 can try to reconcile (e.g., fill in) data that the system does not have. At block 422, the method 400 can identify available imagery in an accessible database. If the available imagery is not relevant, the method 400 can skip to the block 428. If the imagery is relevant, the method 400 can include performing feature (e.g., road) extraction at block 426. The feature extraction may include one or more steps in the methods 300A and 300B described above. The method 400 can then include a manual review process of the extracted features at block 428. During the manual review process, imagery and/or extracted features can be reviewed by a human for accuracy, relevance, and/or consistency.

In some embodiments, blocks 430-454 can be performed when a new batch of street data is obtained, for example, from a third party source or some external network source. Blocks 430-454 can be used to remove redundancies between streets identified using distribution network information, such as breadcrumb data as described with regard to processes 300A and 300B, and external data, such as third party data.

At block 430, the method 400 can include digitizing missing road segments. The method 400 can include adding attribution at block 431. The attribution information can include road class, street name, other road information, and the like, which can be attributed to the breadcrumb data. For example, the breadcrumb data may not include all street information for a street, such as road type, street name, etc. The attribution addition at block 431 includes adding the attributes to the streets on the map.

Road segments may be clipped at block 432 this analysis can be used to find redundant streets within a tolerance, such as 50 feet. The clipping of road segments may be based on the fit of the road segments with other road segments. In some examples, the method 400 includes evaluating symmetrical differences at block 434 the symmetrical difference can be used to split where the overlap occurs, and the overlap can be deleted, to remove redundant streets. For example, some locations may include symmetrical differences, which may be relevant to determining accuracy of the identified map data. Based on the obtained information, the method 400 can include appending street information at block 436. In some implementations, the appended street data can be stored in a database, such as one disclosed herein, at block 426. A backup of this information may be created at block 437 in some configurations.

At block 438, locations may be selected in the method 400. The road segments can be snapped to the network at block 440. A processor can snap streets digitized using a 60 foot tolerance. Snapping the streets can be similar to the processes described herein for converting a collection of breadcrumbs into a line, such as a centerline of a road.

In some implementations, an override can be generated and/or dissolved at blocks 442. To identify an isolated grouping of streets that is not connected to the street network, a small buffer polygon can be generated for the streets digitized or generated. A 0.1 meter buffer polygon can be used. Using a dissolve tool on the new buffer polygon using an unsplit option, the processor can group polygons that are connected to an adjacent polygon. The new dissolved polygons can be selected by location. A layer analysis can be performed where a target layer and source layer are used, where the target layer is the new dissolved polygon layer and the source layer is a main street network.

In some implementations, an override can be generated and/or dissolved at blocks 442, 444, respectively. The method 400 can include appending the override at block 446. The method 400 can include creating intersection vertices at block 448. At block 450, the method 400 includes updating one or more Z values. At block 452, the method 400 can include rebuilding a network topology. This rebuilt network topology can be stored in the database at block 453. The method 400 can terminate at block 454.

FIGS. 5A through 9 depict the stages of mapping processes described herein. For example, the maps depicted in FIGS. 5A-9 can illustrate stages of the processes 300A, 300B and 400 described herein.

Figure 5A:
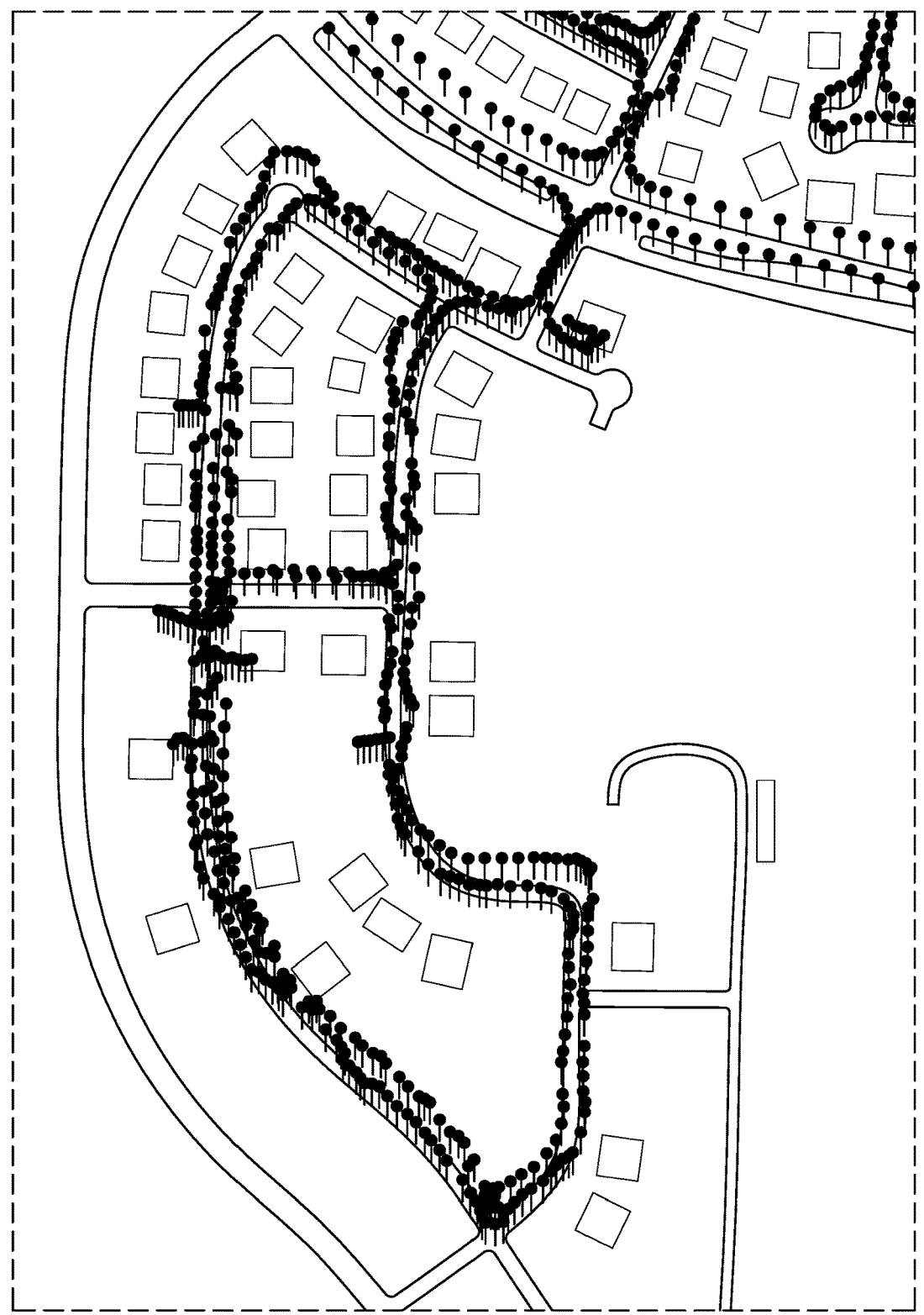
FIG. 5A shows an exemplary area of new construction with breadcrumb data.

FIG. 5A shows an exemplary area of new construction with breadcrumb data. FIG. 5A has an aerial representation of an area having both previously existing homes and new construction. Breadcrumb data from mobile delivery devices is overlain on the map. Using the processes described herein, the breadcrumb data can be used to identify roads, based on the travel of delivery resources in the new construction areas. Delivery points can also be identified. A map can be drawn, such as that shown in FIG. 5B, using the breadcrumb data and the processes described herein.

Figure 5B:
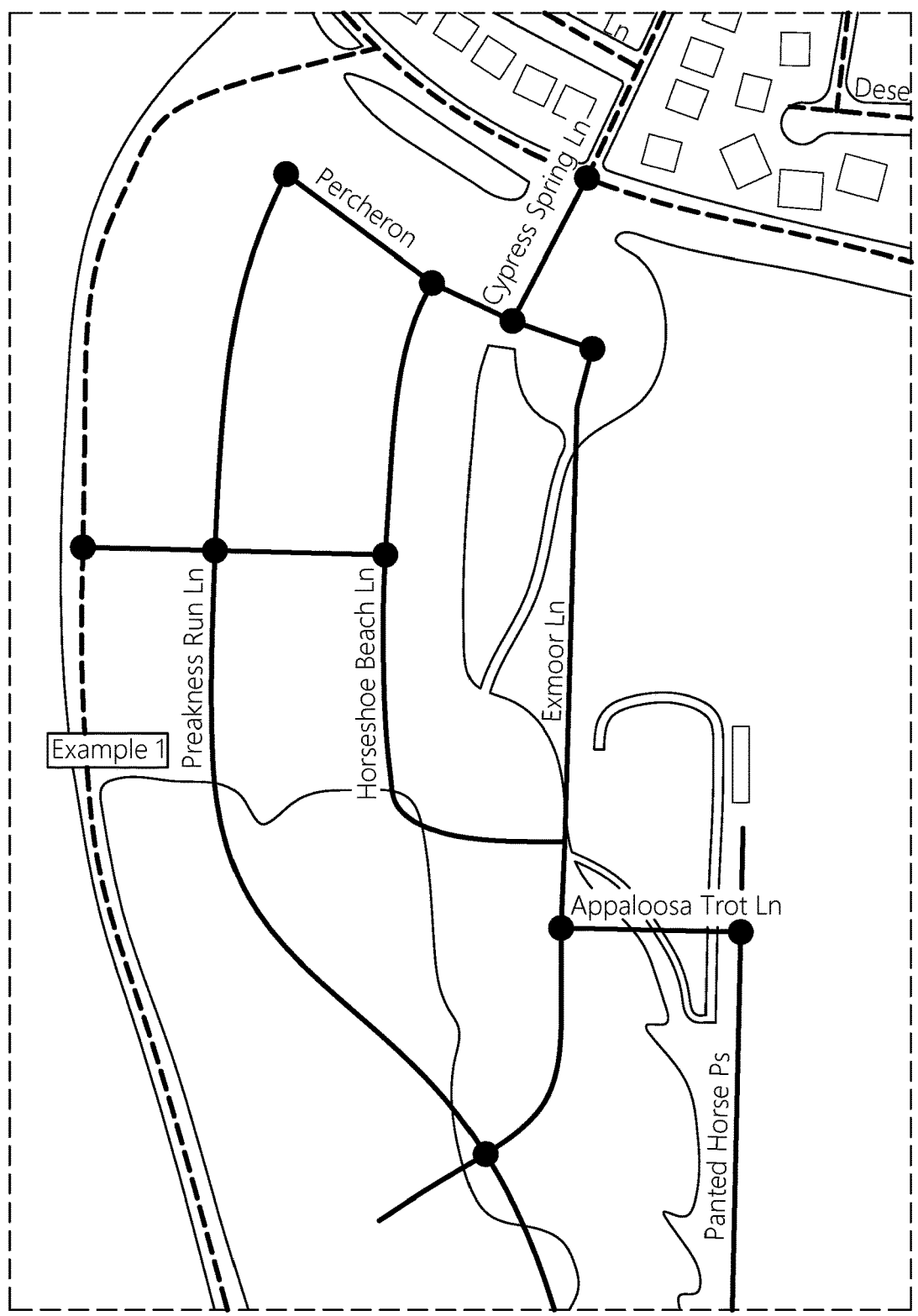
FIG. 5B shows the exemplary area of new construction having new roads identified thereon.

FIG. 5B shows the exemplary area of new construction having new roads identified thereon. The aerial image of FIG. 5B also shows that the systems and methods described herein can identify new roads and/or delivery points where aerial photograph or satellite imagery is old, incomplete, or unavailable showing the current state of an area. In FIG. 5B, roads are drawn over an aerial or satellite image in places where there are otherwise no visual clues to indicate the presence of a road. FIG. 5A shows the same area at a later point in time; however, the processes and systems described herein can generate road maps where there is inaccurate, incomplete, or missing imagery to identify roads. The solid lines can correspond to breadcrumb lines described elsewhere herein, and the dots at intersecting lines can be representative of the identified intersections, and the lines connecting the dots can represent the line segments described elsewhere herein. The dashed lines in FIG. 5B indicate previously existing roads.

Figure 6:
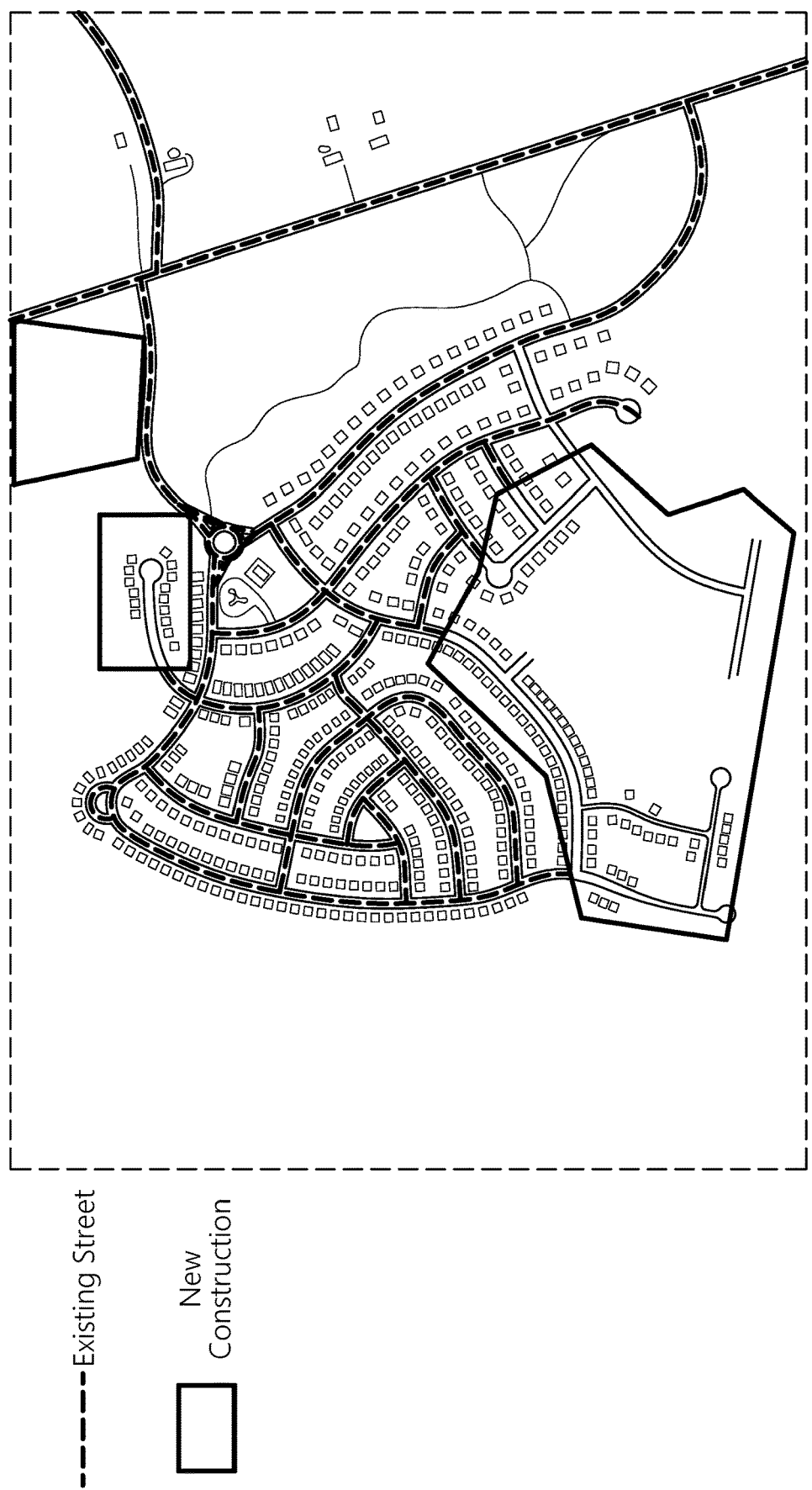
FIG. 6 depicts an exemplary area of existing delivery points and new construction.

FIG. 6 depicts an exemplary area of existing delivery points and new construction. In FIG. 6, a portion of a delivery route is shown with overlays. The first overlay, indicated in a dashed or highlighted broken line, show streets that are existing. These existing streets can have been previously identified by the distribution network, or they could have been obtained from a third party geospatial information company. Also shown in the image of FIG. 6 are areas of new construction. Areas of new construction can be identified by a builder, civic or governmental entity, business, etc., to the distribution network. In some embodiments, the areas of new construction can be identified by analysis of aerial/satellite imagery with existing street overlays, and identifying visual cues of construction where there are no existing street overlays.

Figure 7:
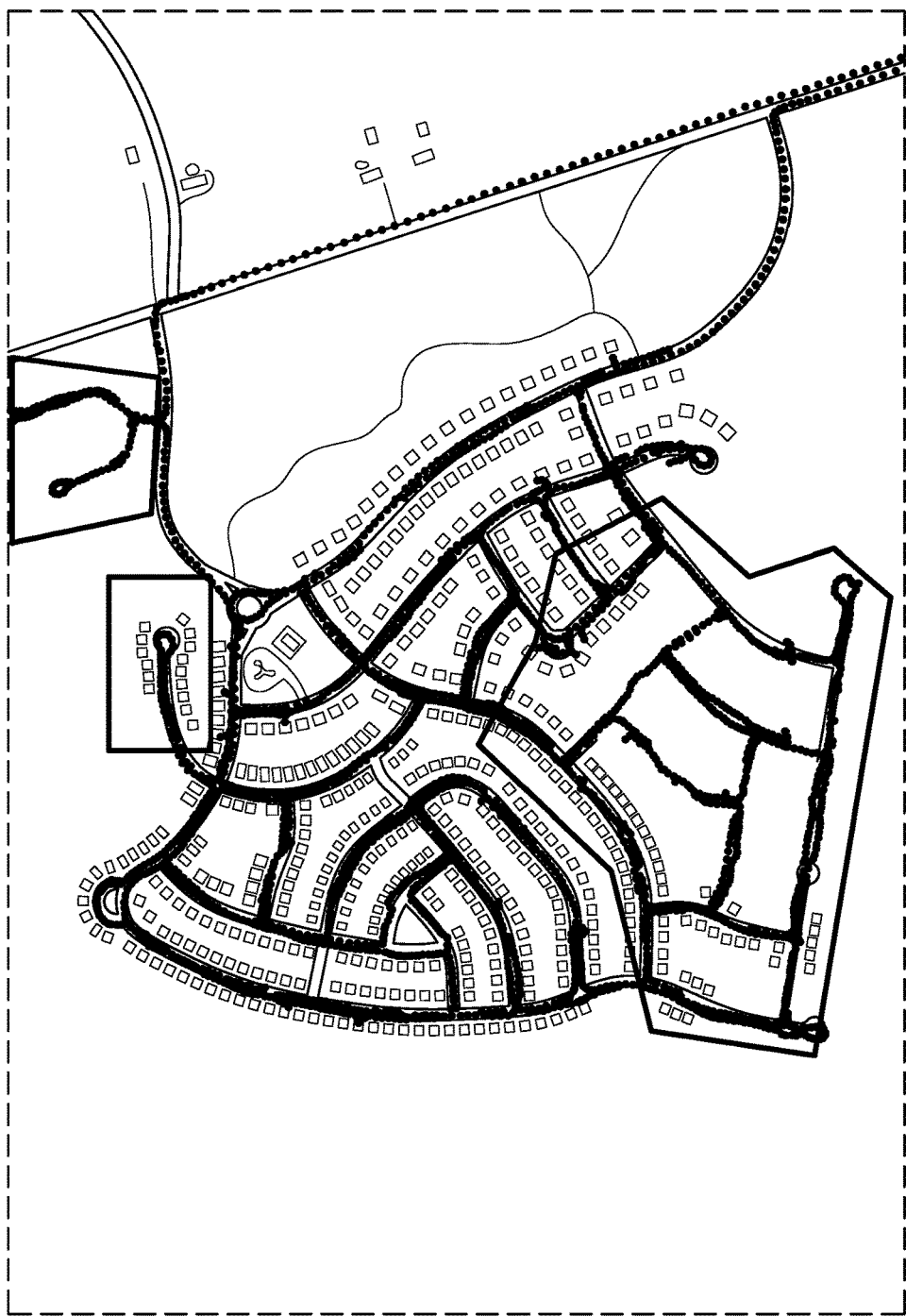
FIG. 7 depicts the exemplary area showing breadcrumb data.

In some embodiments, the computer system 120 identifies areas where breadcrumbs have been obtained or reported, and no existing road information is available. FIG. 7 depicts the exemplary area showing breadcrumb data. The computer system 120 can identify that breadcrumbs exist in an areas which do not have existing street data. The breadcrumb data is shown in FIG. 7 overlain on the map of the same area as that in FIG. 6. The computer system 120 can identify the new construction areas, by identifying areas which have breadcrumb data, but which do not have existing street data, as shown by the bounding boxes. These areas can be selected for processing as described herein. As shown, the breadcrumb data overlays existing roads, as shown in FIG. 6, as well as the new construction areas.

Figure 8:
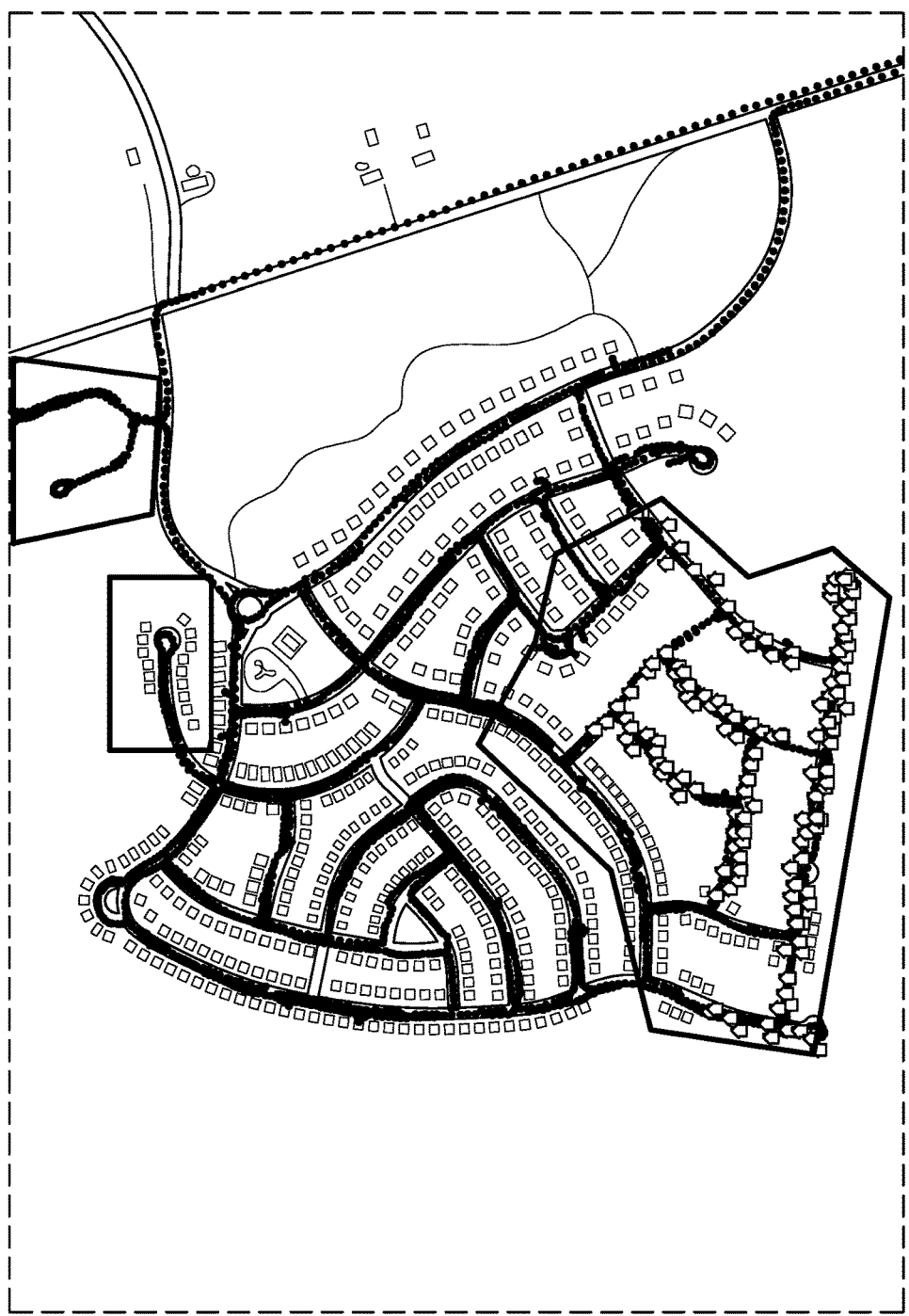
FIG. 8 depicts the exemplary area having delivery points identified in a new construction area.

FIG. 8 depicts the exemplary area having delivery points identified in a new construction area. As described herein, the breadcrumb data can be analyzed to identify where delivery points are located along the travel routes indicate by breadcrumb data. In areas of new construction, there may be delay or time offset when delivery points become active, or are established. For example, not all homes in a new subdivision are completed at the same time, or homes are not all occupied at the same time. Therefore, not all homes or locations will be receiving item deliveries at once, but the implementation of the delivery points will be staggered. To account for the delivery points, areas of new construction can be analyzed with regularity or at a desired periodicity, in order to identify new delivery points. For example, in some embodiments, the process can be repeated at a periodicity, such as once a week, twice a month, once a month, or any other periodicity. The breadcrumb data can be analyzed for clusters to identify delivery points, as described herein. When a new delivery point arises, the breadcrumb data will show a new cluster, or a different behavior than on a previous day, week, or month. This change in breadcrumb data can be indicative of a new delivery point, a move-in, a business opening, etc. The new delivery points identified are overlain on the image in FIG. 8.

Each delivery point can be classified as well, and associate with map or other information. The delivery points can be identified by and/or associated with a house number, street name, city, state, ZIP code, latitude and longitude, delivery point type, route number, and other information. This delivery point information can be used by the distribution network in re-evaluating routes, workloads, etc. as well.

The distribution network can also leverage delivery point information to provide additional services to new locations such as mail items with information and offers for moving, new occupancy, etc. This information can also be used for targeted offers by local companies which offer services related to new areas, such as landscaping, furniture, and others.

Figure 9:
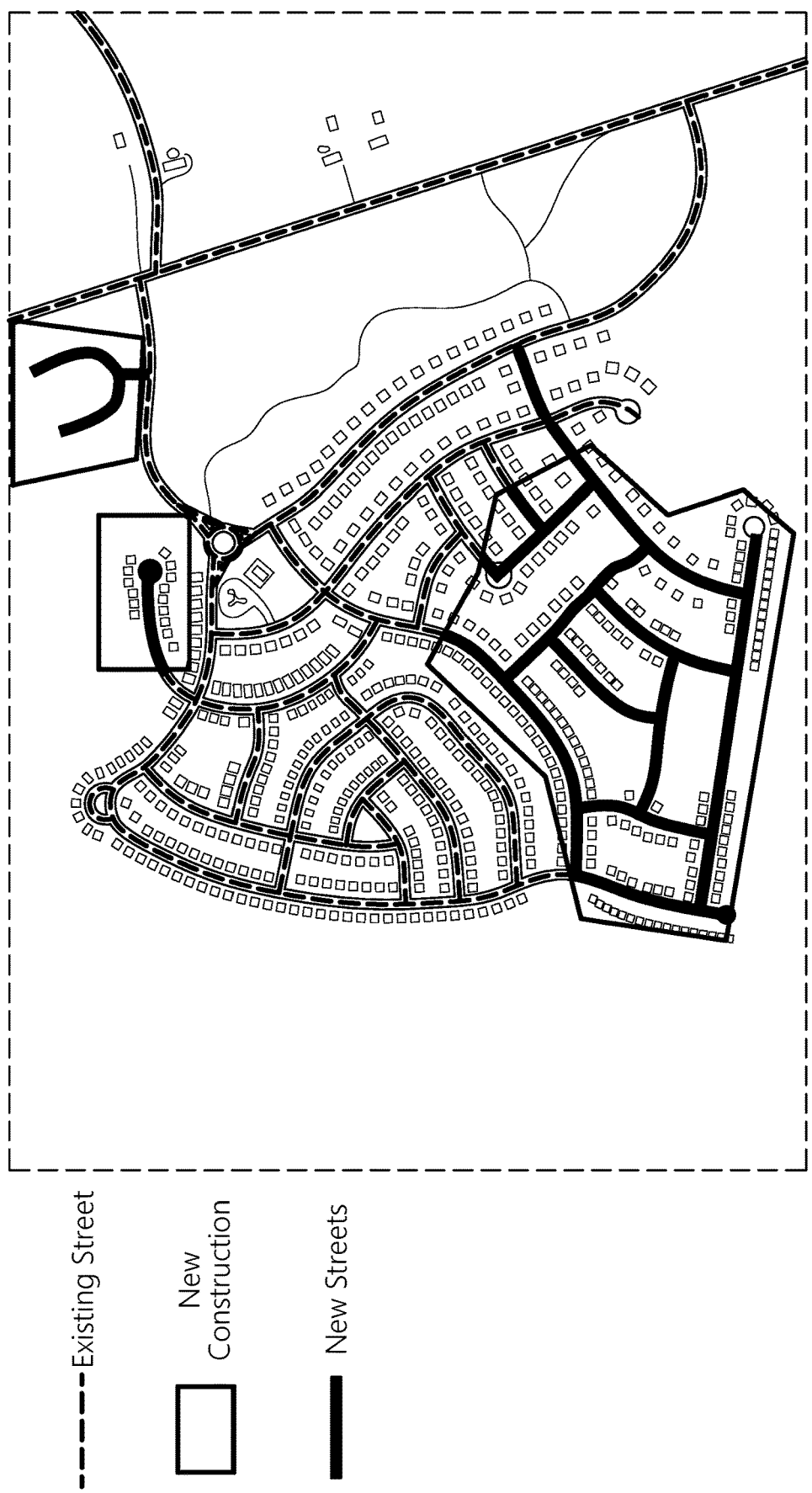
FIG. 9 depicts the exemplary area having new roads mapped thereon.

FIG. 9 depicts the exemplary area having emerging roads mapped thereon. The emerging roads can correspond to those generated using the systems and processes described herein. When the breadcrumb data has been analyzed as described herein, the computer system 120 can generate an updated map of the area showing the new roads determined by the systems and processes described herein. The new streets are overlain on an image of the area for illustration. The systems and processes described herein do not necessarily need to overlay information on aerial imagery. The maps generated may be or may not be associated with or related to aerial/satellite imagery. The new roads can be added to map files and used by the distribution network and other entities who enter into agreements with the distribution network.

The comparison between FIG. 8 and FIG. 9 shows how the systems and processes described herein can identify, classify, and categorize roads in near real-time as the roads are being constructed and as delivery points are arising. The computer system 120 determined where the roads were/would be built based on breadcrumb data, and generated map information before the new construction was completed. The systems and methods described herein show how a distribution network, such as the USPS, has a distinct advantage and a unique ability to identify roads and generate maps before any other entity can do the same. The USPS is uniquely situated to generate and provide geospatial information.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for updating map data, the system comprising:
   a mobile computing device comprising a location circuit to generate breadcrumb data as the mobile computing device moves along a delivery route; and
   a computer system configured to:
      receive, from the mobile computing device, the breadcrumb data;
      generate breadcrumb lines by converting the breadcrumb data into lines connecting the breadcrumbs within the breadcrumb data;
      determine a threshold distance from the generated breadcrumb lines, wherein the threshold distance is a distance within which a threshold number of breadcrumbs of the breadcrumb data are located;
      generate buffer lines bounding the generated breadcrumb lines;
      draw the buffer lines at the determined threshold distance from the generated breadcrumb lines;
      generate buffer centerlines from the generated buffer lines, the buffer centerlines being drawn along a midline between the generated buffer lines;
      determine, based on the buffer center lines, the estimated locations of new streets; and
      update a map based on the new streets.

2. The system of claim 1, the computer system further configured to split the breadcrumb lines at one or more points, the points representing street intersections.

3. The system of claim 1, the computer system further configured to split the buffer centerlines at one or more points, the points representing street intersections.

4. The system of claim 1, the computer system further configured to merge buffer centerlines with the same endpoints into a single line.

5. The system of claim 1, the computer system further configured to remove buffer centerlines associated with breadcrumb lines generated from a breadcrumb representing the last delivery of a day and a breadcrumb representing the mobile device being activated at a delivery facility the next day.

6. The system of claim 1, the computer system further configured to merge buffer centerlines under a threshold length with surrounding buffer centerlines.

7. The system of claim 1, the computer system further configured to merge buffer centerlines within a threshold distance of other buffer lines to the other buffer centerlines.

8. The system of claim 1, the computer system further configured to assign attribute values to the buffer centerlines and to select buffer centerlines representing the locations of new streets based on those attribute values.

9. The system of claim 8, wherein the attribute values include a street name and the date the street first appeared.

10. The system of claim 9, wherein the computer system determines the date the street first appeared based on the breadcrumb data associated with the buffer centerline.

11. The system of claim 1, wherein the threshold distance is determined based on the breadcrumb data and a location of at least one structure.

12. The system of claim 1, wherein the threshold distance is determined based on a type of the breadcrumb data.

13. A method for updating map data, the method comprising:
   receiving, from a mobile computing device, breadcrumb data;
   generating, by a computer system, breadcrumb lines by converting the breadcrumb data into lines connecting the breadcrumbs within the breadcrumb data;
   determining, by a computer system, a threshold distance from the generated breadcrumb lines, wherein the threshold distance is a distance within which a threshold number of breadcrumbs of the breadcrumb data are located;
   drawing, by a computer system, buffer lines bounding the generated breadcrumb lines at the determined threshold distance from the generated breadcrumb lines;
   generating, by a computer system, buffer centerlines from the buffer lines, the buffer centerlines being drawn along a midline between the generated buffer lines; and
   determining, with a computer system, the estimated locations of new streets based on the buffer centerlines; and
   updating, with a computer system, a map based on the new streets.

14. The method of claim 13, method further comprising splitting the breadcrumb lines at one or more points, the points representing street intersections.

15. The method of claim 13, method further comprising splitting the buffer centerlines at one or more points, the points representing street intersections.

16. The method of claim 13, method further comprising merging buffer centerlines with the same endpoints into a single line.

17. The method of claim 13, method further comprising removing buffer centerlines associated with breadcrumb lines generated from a breadcrumb representing the last delivery of a day and a breadcrumb representing the mobile device being activated at a delivery facility the next day.

18. The method of claim 13, method further comprising merging buffer centerlines under a threshold length with surrounding buffer centerlines.

19. The method of claim 13, method further comprising merging buffer centerlines within a threshold distance of other buffer lines to the other buffer centerlines.

20. The method of claim 13, method further comprising assigning, by a computer system, attribute values to the buffer centerlines and selecting, with a computer system, buffer centerlines representing the locations of new streets based on those attribute values.

21. The system of claim 20, wherein the attribute values include a street name and the date the street first appeared.

22. The system of claim 21, wherein the computer system determines the date the street first appeared based on the breadcrumb data associated with the buffer centerline.

* * * * *